B. D. SANDERS.
Bee Hive.
No. 18,523.
Patented Oct. 27, 1857.
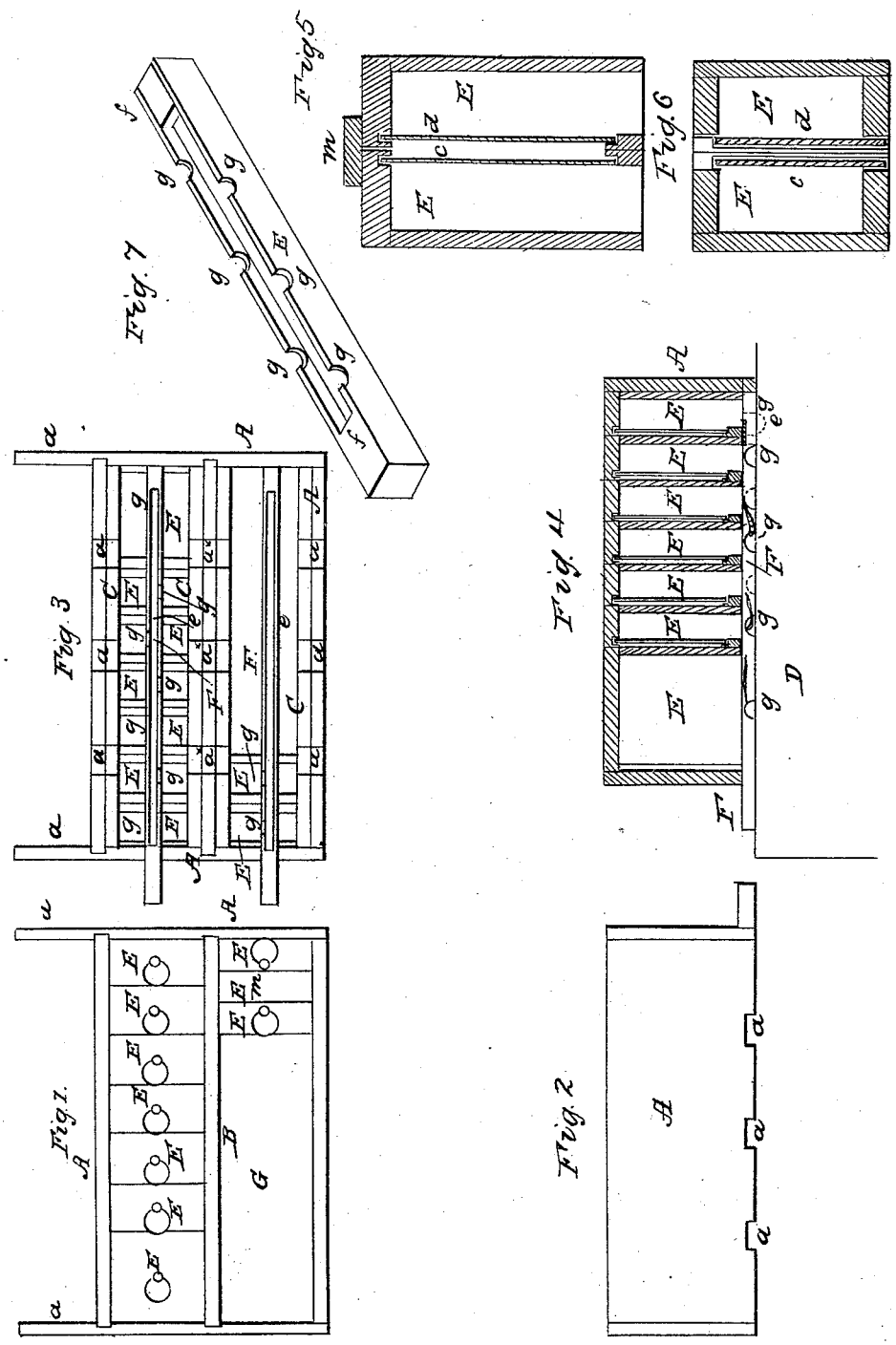

UNITED STATES PATENT OFFICE.

B. D. SANDERS, OF HOLLIDAYS COVE, VIRGINIA.

BEEHIVE.

Specification of Letters Patent No. 18,523, dated October 27, 1857.

*To all whom it may concern:*

Be it known that I, B. D. SANDERS, of Hollidays Cove, in the county of Brook and State of Virginia, have invented a new and useful Improvement in Beehives; and I do hereby declare that the following is a full, clear, and exact description of the same, reference being had to the accompanying drawings, forming part of this specification, in which—

Figure 1, is a plan or top view of a beehive constructed according to my improvement. Fig. 2, is a front view of the same. Fig. 3, is an inverted plan of the same. Fig. 4, is a vertical section of the same. Fig. 5, is a vertical transverse section of the boxes as arranged for a new swarm of bees. Fig. 6, is a horizontal section of the same. Fig. 7, is a perspective view of one of the moth traps inverted.

The nature of my invention consists in an arrangement embracing the outer casing with extended sides and vertical bottomless honey boxes in combination with the grooved perforated moth traps; whereby the area of the hive, by reason of the extended sides can be increased without the necessity of piling one box upon another, at pleasure, by the simple addition of one or more transverse partitions, and whereby also the filth and dirt of all the boxes can, owing to their being bottomless, and on the same plane, be readily removed, and whereby likewise the moth, which infest the inside of the hive, can be entrapped and destroyed.

My invention likewise consists in placing the transparent faces of two of the boxes opposite one another, and uniting the two boxes by a strap so that a new swarm of bees, by the delusion that they are working in the same box, may be induced to carry on their operations in separate chambers, and thus, in case one of the chambers only becomes infected with moth or other annoyers of the bee, the bees in the other shall not be disturbed thereby, and the infected section can be removed without disturbing the uninfected one.

To enable others skilled in the art to make and use my invention I will proceed to describe its construction and operation.

A, is the outer housing or casing; it should have four sides, two of which *a, a*, should be extended so as to allow for a gradual increase in the area of the hive as occasion may require. This increase being effected by introducing one or more partitions beside that B. Around the chambers formed by the outer casing and partition, narrow ledges C, C, are placed internally, and in the front and back sides, at the lower edge thereof, a series of ingress and egress passages *a, a*, are provided, said passages also extending through the partition B. This housing rests upon a platform D.

E, E, are the boxes all arranged on the same level in a vertical position. The first one of the first line of boxes is double the size of the others because it serves to receive the swarm of bees from which all the other boxes are to be supplied. This box is formed by taking two of the boxes and strapping them together as at *m*, so that their transparent faces come opposite to one another, and nearly in contact. By this arrangement the swarm box is divided into two separate compartments, but as the divisions *c, d*, are transparent as seen in Figs. 5 and 6, and come quite near to each other, the new swarm of bees although separated into two swarms are induced to believe that they are all working in the same chamber from the fact of seeing the workings of each other through the transparent partitions. To insure a perfect working of the bees in this hive it is important that the glass partitions should be far enough apart to prevent them becoming clouded by moisture collecting between them and yet near enough to each other to shut out the glare of day and only admit a subdued light. Thus dividing the swarm hive enables me to guard one portion of the swarm from infection by moth or other annoyers of bees, even while the other may be infected, and affords facilities for the clearing of the infected section without disturbing the uninfected one. I deem it proper to observe here that as the hives are incased all around and light shut out at top and bottom, except at the ingress and egress passages, the bees will not have a desire to coat the glass partitions with wax, the light admitted through the ingress passages not being the glare of day, but a subdued light which is necessary and common to all hives.

F, F, are the moth traps, they are simply long strips furnished with gutters *e*, on their underside, said gutters being closed up at each end by shoulders *f, f*. To the gutters inlet passages *g, g*, are provided at the lower side edges of the strips; these passages are formed alternately on opposite sides of the gutter and thus while one is provided for each box in a line or row of eight, four of the passages only require to be on one side of the gutter and the other four on the opposite side. These traps may be arranged as shown in the drawing or just near enough to the side ledges to allow the bees to pass up between them and the ledges. There may also be two other traps at the ends of the box, similarly placed. In this case, the longitudinal and transverse traps will require to be notched so that either set may be slid through the other. With this arrangement of traps if the moths lose their hold and fall on to the platform, they will, seeing the inlet passages, be induced to enter thereby into the traps, supposing they lead to the honey; in which they remain until morning, when by sliding out the traps they may be drawn out and destroyed.

The bees enter the hive by the passages in the outer casing and then pass up between the traps and the ledges. After they have entered the outer casing they have free passage from one box to another of one row, and may also pass through the portion at $a^x$ $a^x$ $a^x$ to the boxes in another row; thus if by mistake they enter on the wrong side they have a chance to reach their own box.

If all the space in the chamber appropriated for a second line or row of boxes is not filled, it can be closed up above the ingress and egress passages by a horizontal board G, and thus the entrance of millers, or other annoyers of the bee at any place except at the ingress and egress passages, shut off.

When the platform below becomes filthy, the boxes can be raised and the filth cleared away, without annoying the bees.

With this arrangement as a whole, the capacity of the hive can be gradually enlarged without piling one box above another as commonly, thus the desires and habits of the bee are more perfectly allowed, and besides facilities for keeping clean, and the introduction of moth traps, which will answer for all the boxes, afforded, and greater protection against ravages secured, for at least a portion of a new swarm of bees.

What I claim as my invention and desire to secure by Letters Patent, is—

1. The combination and arrangement of the outer casing A, with extended sides $a$, $a$, and vertical bottomless honey boxes E, E, with the grooved and peculiarly perforated internal moth traps F, F, substantially as and for the purposes set forth.

2. The combination and arrangement of two honey boxes so as to produce a double chambered swarm hive, when constructed and arranged in relation to each other and to the outer casing A; substantially as shown in Figs. 1, 5, and 6, and for the purposes set forth.

B. D. SANDERS.

Witnesses:
JOHN HINDMAN,
JOHN ROBERTS.